US010345789B2

(12) United States Patent
Ghia

(10) Patent No.: US 10,345,789 B2
(45) Date of Patent: Jul. 9, 2019

(54) SYSTEM AND METHOD FOR VARIABLE PERFORATION PROFILES IN A STACK OF LOTTERY TICKETS

(71) Applicant: Scientific Games International, Inc., Newark, DE (US)

(72) Inventor: Ajay J. Ghia, Cumming, GA (US)

(73) Assignee: Scientific Games International, Inc., Newark, DE (US)

( * ) Notice: Subject to any disclaimer, the term of this patent is extended or adjusted under 35 U.S.C. 154(b) by 376 days.

(21) Appl. No.: 15/188,452

(22) Filed: Jun. 21, 2016

(65) Prior Publication Data

US 2017/0364059 A1 Dec. 21, 2017

(51) Int. Cl.
| | |
|---|---|
| *G05B 19/4093* | (2006.01) |
| *B23K 26/359* | (2014.01) |
| *B23K 26/00* | (2014.01) |
| *G05B 17/02* | (2006.01) |
| *B23K 26/03* | (2006.01) |

(Continued)

(52) U.S. Cl.
CPC ...... *G05B 19/40937* (2013.01); *A63F 3/0665* (2013.01); *B23K 26/0006* (2013.01); *B23K 26/032* (2013.01); *B23K 26/0622* (2015.10); *B23K 26/0821* (2015.10); *B23K 26/0846* (2013.01); *B23K 26/359* (2015.10); *B23K 26/384* (2015.10); *B23K 26/402* (2013.01); *G05B 17/02* (2013.01);
(Continued)

(58) Field of Classification Search
CPC .... G05B 19/40936; G05B 2219/31203; G05B 19/40937; G05B 17/02; B23K 26/359;
B23K 26/0006; B23K 2103/40; B23K 26/0622; B23K 26/0821; B23K 26/384; B23K 26/032; B23K 26/0846; B23K 26/402; B23K 2101/16; G07F 17/42

USPC .......................................................... 700/128
See application file for complete search history.

(56) References Cited

U.S. PATENT DOCUMENTS

| | | |
|---|---|---|
| 4,260,062 A | 4/1981 | Lockett |
| 4,634,881 A | 1/1987 | Billion |

(Continued)

FOREIGN PATENT DOCUMENTS

| | | |
|---|---|---|
| WO | WO 98/31477 | 7/1998 |
| WO | WO 98/44335 | 10/1998 |

*Primary Examiner* — Dzung Tran
(74) *Attorney, Agent, or Firm* — Dority & Manning, P.A.

(57) ABSTRACT

A method and associated system are provided for producing a perforation line between adjacent lottery tickets in an automated production line wherein a substrate having lottery tickets printed thereon is conveyed through a perforation station in the production line. A perforation machine in the line is controlled to define a perforation line between the adjacent lottery tickets. The controlling process includes inputting control variables into a controller associated with the perforation machine, the control variables relating to conditions that determine a desired perforation profile of the perforation line. The controller programs the perforation machine with a specific perforation profile for the perforation line that is generated based on the entered control variables, and changes the perforation profile upon inputting of different values for the control variables. The perforation profile is specifically tailored to the control variables between different ticket production runs, or between tickets in the same ticket production run.

6 Claims, 4 Drawing Sheets

(51) Int. Cl.
 *B23K 26/08* (2014.01)
 *B23K 26/402* (2014.01)
 *B23K 26/082* (2014.01)
 *B23K 26/0622* (2014.01)
 *B23K 26/384* (2014.01)
 *A63F 3/06* (2006.01)
 *B23K 103/00* (2006.01)
 *B23K 101/16* (2006.01)

(52) U.S. Cl.
 CPC ...... *B23K 2101/16* (2018.08); *B23K 2103/40* (2018.08); *G05B 2219/31203* (2013.01)

(56) References Cited

U.S. PATENT DOCUMENTS

| | | | |
|---|---|---|---|
| 4,723,659 A | 2/1988 | Billion | |
| 4,858,123 A * | 8/1989 | Alexoff | A63F 3/065 101/484 |
| 5,064,179 A * | 11/1991 | Martin | B65H 35/10 225/100 |
| 5,109,236 A | 4/1992 | Watanabe et al. | |
| 5,487,472 A | 1/1996 | Satake et al. | |
| 5,591,985 A | 1/1997 | Tsuji et al. | |
| 5,628,574 A * | 5/1997 | Crowley | B41J 11/46 101/227 |
| 5,939,727 A | 8/1999 | Sommer | |
| 6,061,086 A | 5/2000 | Reimer et al. | |
| 6,576,862 B1 * | 6/2003 | Costin | B41M 5/24 219/121.6 |
| 6,819,972 B1 * | 11/2004 | Martin | D06B 11/0096 219/121.68 |
| 6,864,970 B1 | 3/2005 | Ruymen et al. | |
| 2008/0280088 A1 * | 11/2008 | Baum | A47K 10/16 428/43 |
| 2011/0070390 A1 * | 3/2011 | Costin, Sr. | B23K 26/0846 428/43 |
| 2011/0308405 A1 * | 12/2011 | McNeil | B26F 1/10 101/24 |

* cited by examiner

SYSTEM AND METHOD FOR VARIABLE PERFORATION PROFILES IN A STACK OF LOTTERY TICKETS

BACKGROUND

Instant scratch-off lottery tickets are generally supplied to retail vending locations in the form of individual rolls or folded packs (also referred to as "packs" or "books") of interconnected tickets, wherein perforation lines separate the ends of adjacent tickets. The common edge between adjacent tickets extends perpendicular to the top side and bottom side of each ticket. The tickets include any manner of indicia and graphics, as well as a play area wherein one or more game symbols are covered with a scratch-off coating. For dispensing, the lead ticket is torn from the pack or roll along the perforation line. The packs or rolls may be loaded into a dispenser wherein the leading ticket is pulled through a dispensing slot prior to being separated.

The scratch-off lottery tickets are typically mass produced in a high-speed production line that includes a perforating machine that defines the perforation line between adjacent tickets. With the conventional machinery and methods, however, the perforation line profile is defined by the mechanical cutter profile and cannot vary unless the manufacturing line is stopped and the cutter is exchanged for another that produces a different perforation profile. Even between different ticket production runs, it is a relatively complicated and time consuming procedure to change out the mechanical cutter at the perforation station, which may be necessary when a change is made in the paper stock to be processed into the lottery tickets. Thus, the inability to quickly and reliably change perforation profiles either between production runs or mid-stream of a production run is a particular disadvantage with conventional systems and methods.

The present invention provides a solution to the problem noted above, as well as adding additional functionalities to the perforation process in lottery ticket production lines.

SUMMARY

Objects and advantages of the invention will be set forth in part in the following description, or may be obvious from the description, or may be learned through practice of the invention.

In accordance with aspects of the invention, a method is provided for producing a perforation line between adjacent lottery tickets in an automated production line. In a particular embodiment, the lottery tickets are instant scratch-off tickets. The method includes conveying a substrate, such as a paper stock, through a perforation station in the production line, wherein the substrate has individual lottery ticket indicia printed thereon such that a continuous stream of adjacent lottery tickets oriented end-to-end are conveyed through the perforation station. The substrate may have a plurality of rows of such tickets, wherein the rows are subsequently separated in a downstream slitter station prior to packaging the tickets. A perforation machine at the perforation station is controlled by a controller to define a perforation line between the ends of adjacent lottery tickets.

This control process includes inputting one or more control variables into the controller, wherein the control variables relate to conditions that determine a desired perforation profile of the perforation line. The controller programs the perforation machine with a specific perforation profile for the perforation line that is generated based on the entered control variables. The controller changes the perforation profile upon inputting of different values for the control variables. The perforation profile can thus be specifically tailored to the control variables between different ticket production runs, or between tickets in the same ticket production run.

In a particular embodiment, the control variables relate to particular environmental conditions expected at a dispensing location of the lottery tickets being produced, such as one or both of temperature and humidity.

In another embodiment, the control variables may relate to characteristics of a substrate stock on which the lottery tickets are printed in the production line, such as the weight of the paper, fiber content, coatings, and the like.

In still another embodiment, the control variables relate to a combination of the particular environmental conditions expected at a dispensing location of the lottery tickets and characteristics of a substrate stock on which the lottery tickets are printed in the production line.

Different perforation profiles may be pre-generated (e.g., by the controller or another computer) for specific values of the control variables and stored in an electronic library that is accessible by the controller. The controller can then select one of the pre-generated perforation profiles that is a closest match for the input control variables. The controller can use the pre-generated profile, or further modify the pre-generated profile based on the input control variables.

A real-time feedback loop may be incorporated in the process to detect deviations from the pre-generated profiles and modify the perforation machine operating parameters accordingly.

In a desirable embodiment, the perforation machine is a laser perforation machine having one or more laser perforation heads that are controlled by the controller for producing the different perforation profiles.

The invention also encompasses a system for implementing the methods described above. For example, a system is provided for producing a perforation line between adjacent lottery tickets in an automated production line wherein a substrate is conveyed through a perforation station in the production line, the substrate having individual lottery ticket indicia printed thereon such that a continuous stream of adjacent lottery tickets oriented end-to-end are conveyed through the perforation station. The system includes a perforation machine at the perforation station to define a perforation line between the ends of the adjacent lottery tickets. A controller is in communication with the perforation machine and is configured to: receive inputted control variables that relate to conditions that determine a desired perforation profile of the perforation line; program the perforation machine with a specific perforation profile for the perforation line that is generated based on the entered control variables; reprogram the controller with a different perforation profile upon receipt of different values for the control variables; and specifically tailor the perforation profiles to the control variables between different ticket production runs, or between tickets in the same ticket production run.

In a desirable embodiment of the system, the perforation machine is a laser perforation machine having one or more laser perforation heads that are controlled by the controller for producing the different perforation profiles.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

DETAILED DESCRIPTION

Figure 1:
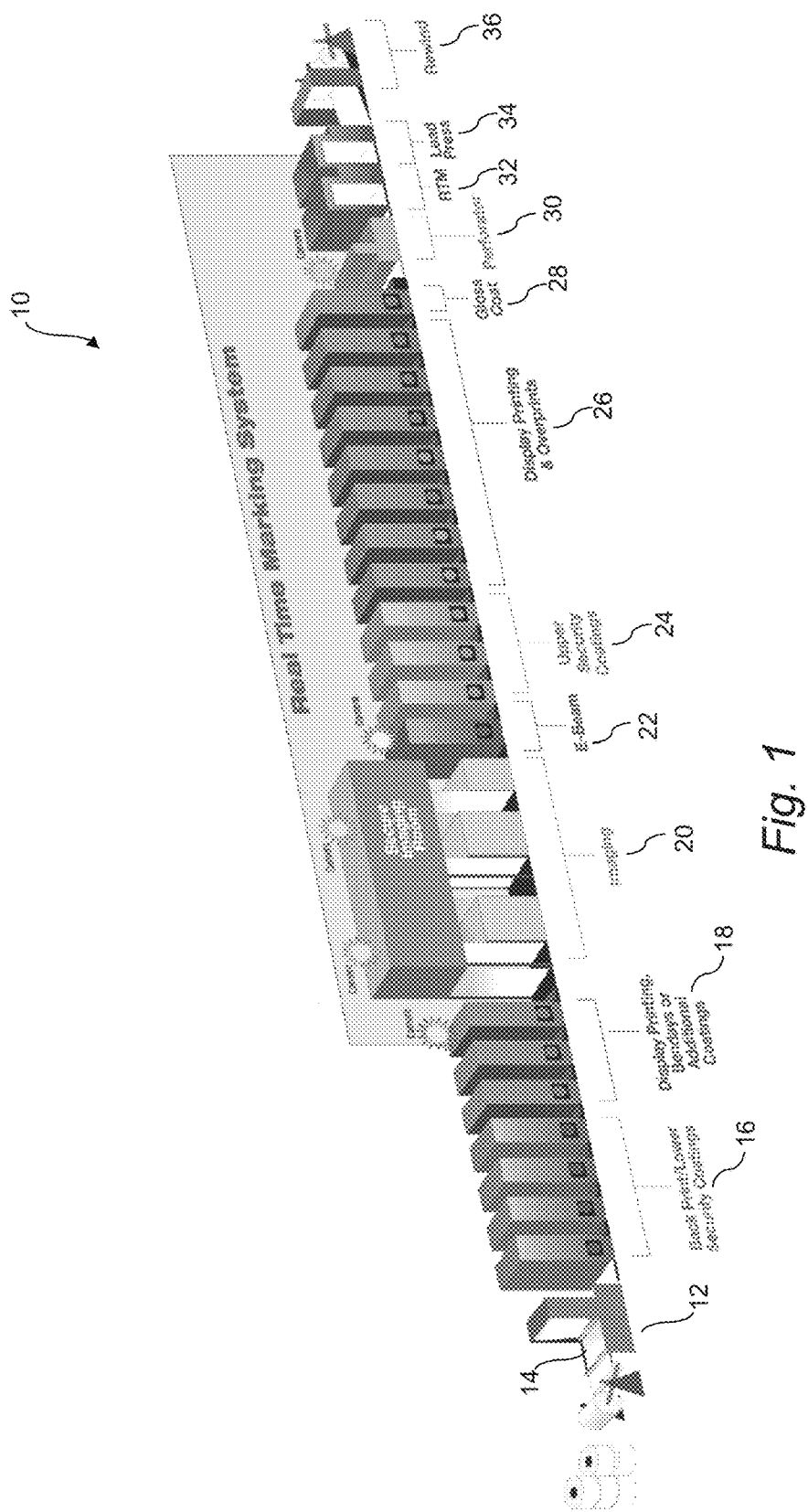
FIG. 1 is an operational diagram of a lottery ticket production line that incorporates a perforation station in accordance with the present invention.

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

As mentioned, the present invention relates to method and system embodiments for producing a perforation line between adjacent lottery tickets in an automated production line. In a particular embodiment, the lottery tickets are instant scratch-off tickets. The present invention appreciates a concept not recognized or practiced in the industry, namely that there is no one universal perforation profile well-suited for all types of paper substrates or environmental conditions in which the tickets are eventually dispensed.

The perforation profile is the pattern and/or size of the holes or slits defined through the substrate along the perforation line. The greater the number or size of the holes or slits, the lesser amount of intact substrate remains, resulting in a weaker perforation line. Thus, the perforation profile dictates the amount of "tear" force necessary to separate a leading ticket from the remainder of the pack or roll, or in other words, the strength of the perforation line. The perforation line needs to have adequate strength to ensure that the tickets remain attached under all anticipated conditions. Perforation failures wherein tickets prematurely separate within a pack or roll result in numerous undesirable events. For example, if the pack or roll is loaded into a dispenser, the dispenser bin must be unlocked to retrieve and thread the disconnected ticket through the dispensing slot. Loading of new packs into a dispenser wherein the tickets have separated at one or more perforation lines results in multiple mini-packs that must be loaded in a particular order to ensure sequential serial number dispensing. These mini-packs are usually taped together at the failed perforation lines. Consumers are wary of a "new" ticket that has been taped to another ticket, and often refuse to purchase the questionable ticket. Separation of the tickets also brings into question accountability issues.

At the same time, the perforation lines must not be so strong as to require excessive tearing force to separate the tickets. This excessive force often results in tickets tearing at locations other than along the perforation line, as well as leaving a jagged edge along the separated perforation line. In certain sectors, the industry appears to be turning to automated, motor-driven dispensers wherein the tickets are automatically metered out of a dispenser bin. In most cases, this technology relies on an edge sensor to detect the leading edge of a ticket being dispensed, wherein the defined length of the ticket is then dispensed by the motor being driven for a time corresponding to the defined length. A jagged edge resulting from a faulty perforation line can "fool" the sensor, resulting in too little or too much of a motor run time. As more and more tickets are dispensed, this issue compounds itself.

With the present system and method embodiments, certain control variables are recognized as affecting characteristics of the ticket substrate, and thus the strength of a given perforation profile. For example, one such control variable is humidity, more particularly the humidity at the location where the tickets are dispensed. With paper substrates in particular, a higher humidity essentially causes the substrate to absorb moisture and swell. This swelling of the stock material along the perforation line generally results in a greater tear strength to separate the tickets along the perforation line.

Another control variable is temperature, more particularly the temperature at the location where the tickets are dispensed. With paper substrates in particular, a higher temperature generally causes the tickets to become relatively more brittle, which results in a weaker perforation line.

Still another control variable is the type, content, thickness, or density of the substrate material. For a given perforation profile, a thicker or more dense substrate requires a greater tear strength to separate the tickets along the perforation profile. Likewise, the synthetic fiber material versus pulp fiber material content of the substrate will affect the necessary tear strength. Certain pulp fibers produce a stronger paper stock as compared to other types of pulp fibers.

In accordance with aspects of the present system and method embodiments, values for one or more of these control variables are determined and used to tailor a perforation profile for a particular type of lottery ticket (e.g., type of substrate) and/or for anticipated environmental conditions at the location the tickets will be dispensed.

FIG. 1 depicts an exemplary production line 10 for manufacturing instant scratch-off lottery tickets that may be configured with aspects of the present invention. This particular production line 10 is presented for illustrative purposes only and to place the invention in an exemplary operating environment. It should be appreciated that the present methods and systems are not limited to any particular production line configuration.

Still referring to FIG. 1, a substrate 14 on which the lottery tickets are to be printed is delivered to an unwind station, typically in the form of rolls, with the unwind station including a suitable web tensioning device. The substrate is then conveyed to a first printing station 16 that includes multiple printing machines for applying one or more security lower security layers (e.g. a black layer) to the substrate.

The substrate 14 is then conveyed to second printing station 18 that includes multiple printing machines for applying any desired manner of display images, confusion patters (e.g. Benday patterns), or additional coatings over the security layers for each lottery ticket.

The substrate 14 is then conveyed to a secure imaging station 20, which may include a plurality of printing/imaging machines in a highly secured room, wherein the game data indicia is printed on each of the tickets and a scratch-off layer of material is applied over the game data indicia. The tickets are conveyed from the secure imaging room through an "E-Beam" clear coating station 22 wherein a coating is applied and cured to protect the game play data. Ultimately, the perforation profile is synchronized with the data and other indicia printed on the tickets.

The substrate 14 is then conveyed through a security coatings station 24 wherein a plurality of printing machines apply one or more securing coatings over the scratch-off layer.

The substrate 14 is then conveyed through an additional printing station 26 wherein any manner of graphics are printed over the scratch-off layer and/or non-game play areas of each ticket.

The substrate 14 is then conveyed through a gloss coat application machine 30.

From the gloss coat station 28, the substrate 14 is conveyed through a perforation station 30 configured in accordance with the invention (and described in greater detail below). At this station, perforation lines are defined in the substrate transverse to the longitudinal travelling direction of the substrate 14. As is well understood, the perforation line defines a separation line between adjacent ends of interconnected tickets.

The perforated substrate 14 is then conveyed through an RTM ("Real Time Marking") station 32 where press personnel watch/inspect the web substrate while printing for quality control issues.

The substrate 14 is then conveyed through a "Lead Press" station 34, which includes the main press console. This is the station where a "lead press man" essentially controls the entire press operation.

Finally, the substrate 14 is brought to a rewind station 36 wherein the perforated substrate 14 with multiple rows of lottery tickets printed thereon is wound back into a roll package. From there, the rolls are eventually transported to additional processing stations wherein the substrate 14 is unwound, conveyed through a slitter wherein the individual rows of interconnected and perforated tickets are separate. The individual rows of tickets are then conveyed through a folding station wherein the tickets are folded in a Z-pattern into individual packs prior to being wrapped and sealed.

Figure 2:
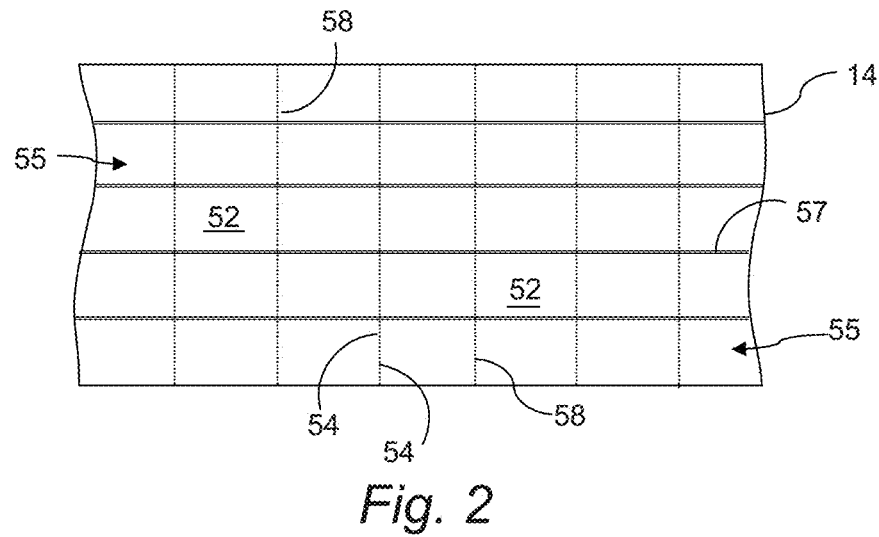
FIG. 2 is a diagram of a substrate having multiple rows of lottery tickets and perforation lines across the substrate that separate the adjacent ends of the lottery tickets.

FIG. 2 depicts a partial section of the web 14 after passing through the perforation station 30. A plurality of rows 55 of individual lottery tickets 52 are printed on the substrate 14. The ticket rows 55 have shared sides 57 that are delineated by any manner of graphics, alignment marks, etc. The rows 55 are eventually separated at the sides 57 by the downstream slitter. The individual tickets 52 within each row have adjacent ends 54 defined by the perforation lines 58.

Figure 3:
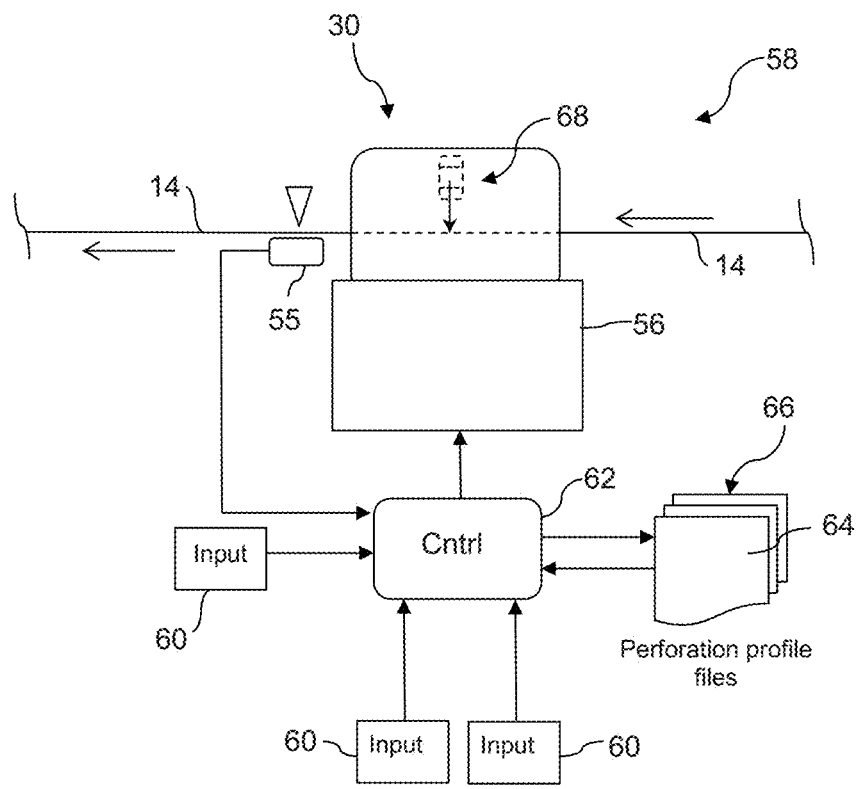
FIG. 3 is a block diagram of a perforation system in accordance with aspects of the invention.

FIG. 3 depicts a system and method 50 in accordance with the invention implemented at the perforation station 30. The substrate 14 is conveyed through the perforation station 30 in the production line, wherein the substrate 14 has individual lottery ticket indicia printed thereon such that a continuous stream of adjacent lottery tickets 52 (FIG. 2) oriented end-to-end are conveyed through the perforation station 30. A perforation machine 56 at the perforation station 30 is controlled by controller 62 to define a perforation line 58 (FIG. 2) between the adjacent lottery tickets. This control process includes inputting one or more control variables 60 into the controller 62. The control variables 60 relate to conditions that determine a desired perforation profile of the perforation lines 58. The controller 62 programs the perforation machine 56 with a specific perforation profile 64 (FIGS. 5 and 6) for the perforation line 58 that is generated based on the entered control variables 60. The controller 56 changes the perforation profile 64 upon inputting of different values for the control variables 60. Thus, perforation profile 64 is specifically tailored to the control variables 60 between different ticket 52 production runs, or between tickets 52 in the same ticket production run.

As discussed above, the control variables 60 may relate to particular environmental conditions expected at a dispensing location of the lottery tickets being produced, such as temperature and humidity. Thus, tickets 52 produced for sale in a relatively dry or arid location may have a different perforation profile 58 as compared to tickets intended for sale in a humid coastal location, and so forth.

In addition, or alternatively, the control variables 60 may relate to characteristics of the substrate 14 stock on which the lottery tickets are printed in the production line, such as the thickness, density, composition, and so forth, of the stock that affect the strength of the peroration profile. For example, the control variables 60 may relate to a combination of particular environmental conditions expected at a dispensing location of the lottery tickets and characteristics of a substrate 14 stock on which the lottery tickets are printed in the production line.

The method may include generating a plurality of different perforation profiles 60 for specific values of the control variables 60 and storing these pre-generated profiles 64 in an electronic library 66 that is accessible by the controller 62. With this configuration, the controller need not generate the profile 64 upon receipt of each set of control variables, but can select the stored profile 64 that is the closest match for the values of the input control variables 60. The controller can program the perforation machine 56 directly with the retrieved profile 64, or may further modify the profile 64 based the input control variables 60.

Figure 4:
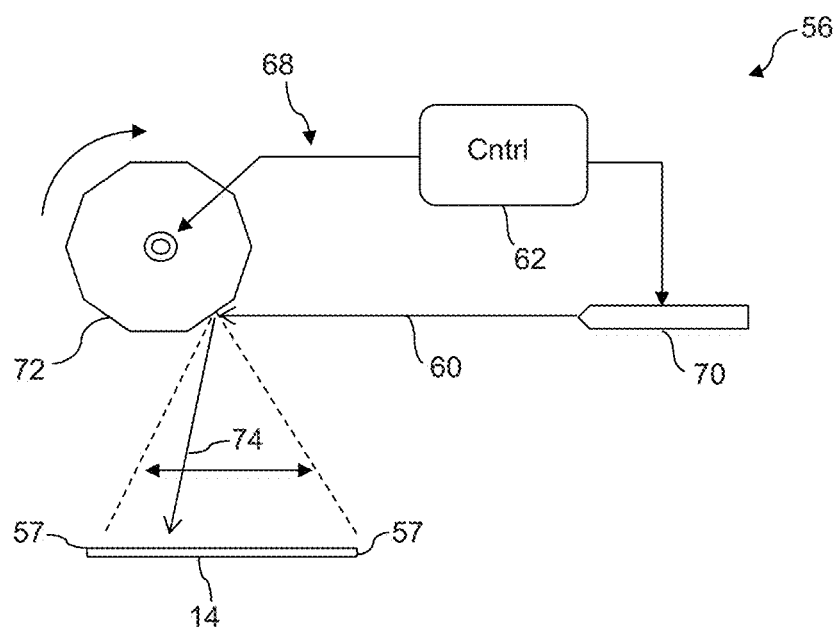
FIG. 4 is a block diagram of an embodiment of a laser perforation system.

In a particular embodiment, the perforation machine 56 is a computer-controlled laser perforation machine 68, as depicted in FIG. 4. Commercial laser perforators are available, and it is contemplated that a number of these readily available machines 68 may be modified and configured to operate in a lottery ticket production line in accordance with aspects of the invention discussed herein. For example, FIG. 4 depicts a laser perforation 68 having one or more laser generators 70. In order to generate and direct a pulsed laser beam 74 in a transverse direction across the substrate 14 as the substrate moves continuously in the longitudinal traveling direction, a relatively high speed rotary mirror 72 may be utilized to direct the beam 74 in a back-and-forth traversing path between the edges 57 of the substrate, as depicted by the double-arrow line in FIG. 4.

A laser perforation machine 68 has distinct advantages. For example, with a mechanical cutter, the perforation blades produce a varying perforation characteristic as the blades dull with use. The laser does not dull. Also, mechanical (blade) perforation characteristics are non-uniform depending on which side of the web the puncture begins, as fibers are compressed downward as the blade penetrates the paper. A laser provides more symmetric characteristics as the web is severed cleanly and uniformly from top to bottom without compression of the fibers.

As depicted in FIG. 3, it may be desired to include real-time feedback to the laser machine 68 that is used to vary laser intensity. For example, a sensor 55 may be utilized to detect light transmitted through the perforation line, wherein the amount of light detected is an indication of perforation characteristics. Such feedback can be used to vary the laser intensity to achieve an even greater uniformity of the perforation line.

Figure 5:
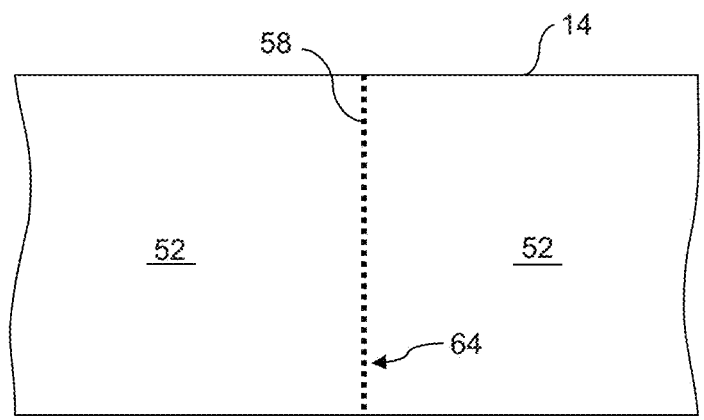
FIG. 5 is a top view of interconnected lottery tickets having a first type of perforation profile.
Figure 6:
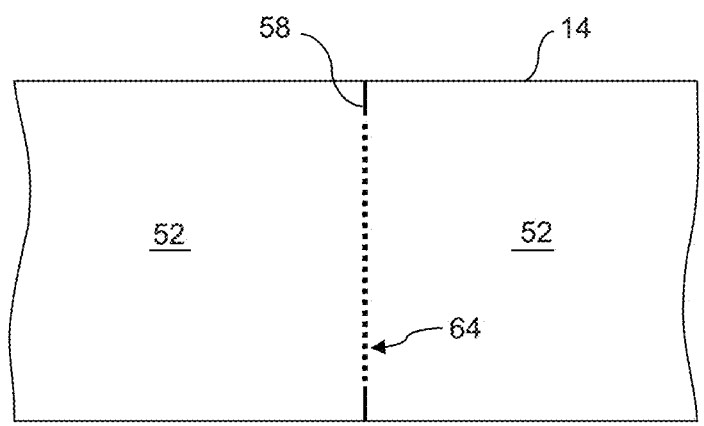
FIG. 6 is a top view of interconnected lottery tickets having a second type of perforation profile.

FIGS. 5 and 6 are provided to illustrate the concept of different perforation profiles 64 between the adjacent ends of interconnected lottery tickets 52. The differences between the profiles 64 result from the duration and intensity of the pulsed laser 74. The longer the "on" time of the laser 74 and/or the intensity (power) of the laser, the longer or wider are the holes defined through the substrate 14 (indicated by the dark portions of the perforation line 58 in FIGS. 5 and 6). Likewise, the longer the "off" time of the pulsed laser 74, the greater is the amount of substrate that remains intact between the holes. Thus, the operation of the laser generator 70 is controlled in accordance with one of the perforation profiles 64 to achieve the tailored perforation line 58 having the desired strength profile.

It can be appreciated from FIG. 6 that the perforation profile 64 need not be uniform across the entire perforation line 58. The present system and method provide the unique benefit to tailor discrete specific sections or portions of the perforation line 58. For example, as depicted in FIG. 6, it may be desired to provide the extreme ends of the perforation line 58 with an initial elongated tear or separated portion in order to ensure that subsequent tears to separate the tickets 52 propagate along the perforation line 58 and require a reduced initial tear force.

Aspects of the present method and system refer to a "controller", as discussed above. The term "controller" is used herein to encompass any configuration of computer hardware and software that is maintained to carry out the functionalities of the present system and associated method, as well as any manner of additional lottery functions known to those skilled in the art. It should be readily appreciated that the controller 62 may include an integrated server, or any manner of periphery server or other hardware structure. The controller 62 may include a memory for storing operating procedures and routines related to the perforation machine, a memory for the library 66 of stored perforation profiles 64, a microprocessor (MP) for executing the stored programs 64, a random access memory (RAM) and an input/output (I/O) bus. These devices may be multiplexed together via a common bus, or may each be directly connected via dedicated communications lines, depending on the needs of the system 10.

The controller 62 may be directly or indirectly connected through an I/O bus to any manner of peripheral devices such as storage devices, wireless adaptors, printers, and the like. In addition, a database (DB) may be communicatively connected to the controller 62 and provide a data repository for the storage and correlation of the perforation profiles 64 with particular values of the control variables 60.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A method for producing a perforation line between adjacent lottery tickets in an automated production line, comprising:
   conveying a substrate through a perforation station in the automated production line, the substrate having individual lottery ticket indicia printed thereon such that a continuous stream of adjacent lottery tickets oriented end-to-end are conveyed through the perforation station;
   controlling a perforation machine at the perforation station to produce a perforation line between the adjacent lottery tickets, wherein the controlling process further comprises:
   inputting one or more control variables into a controller associated with the perforation machine, wherein the control variables relate to conditions that determine a desired perforation profile of the perforation line;
   the controller programming the perforation machine to produce the perforation line with a specific perforation profile based on the entered control variables;
   the controller changing the perforation profile upon inputting of different values for the control variables;
   wherein the control variables relate to environmental conditions expected at a dispensing location for the lottery tickets being produced and the perforation profile is changed between different ticket production runs, or between tickets in the same ticket production run based on changes in the environmental conditions.

2. The method according to claim 1, wherein the control variables are one or both of temperature and humidity at the dispensing location.

3. The method according to claim 1, wherein the control variables relate to a combination of the environmental conditions expected at a dispensing location of the lottery tickets and characteristics of a substrate stock on which the lottery tickets are printed in the automated production line.

4. The method according to claim 1, wherein different perforation profiles are pre-generated for specific values of the control variables and stored in an electronic library accessible by the controller, wherein the controller selects one of the pre-generated perforation profiles that is a closest match for the input control variables.

5. The method according to claim 4, wherein the controller further modifies the selected pre-generated perforation profile based on the input control variables.

6. The method according to claim 1, wherein the perforation machine is a laser perforation machine having one or more laser perforation heads that are controlled by the controller for producing different perforation profiles.

* * * * *